(12) United States Patent
Beaujot et al.

(10) Patent No.: US 12,495,742 B2
(45) Date of Patent: Dec. 16, 2025

(54) LIFTING SYSTEMS FOR PORTABLE GRAIN BINS

(71) Applicant: Agminded Research & Development Ltd., Regina (CA)

(72) Inventors: Patrick M. Beaujot, Kipling (CA); Trevor Phenix, Regina (CA); David William Kosior, Fillmore (CA); Michael Rosumowitsch, Brandon (CA)

(73) Assignee: T-BIN AG EQUIPMENT LTD., Regina (CA)

( * ) Notice: Subject to any disclaimer, the term of this patent is extended or adjusted under 35 U.S.C. 154(b) by 199 days.

(21) Appl. No.: 18/333,024

(22) Filed: Jun. 12, 2023

(65) Prior Publication Data

US 2023/0403983 A1    Dec. 21, 2023

Related U.S. Application Data

(60) Provisional application No. 63/353,284, filed on Jun. 17, 2022.

(51) Int. Cl.
| | |
|---|---|
| *B65D 88/26* | (2006.01) |
| *A01F 25/14* | (2006.01) |
| *B65D 88/16* | (2006.01) |
| *B65D 88/52* | (2006.01) |

(52) U.S. Cl.
CPC .......... *A01F 25/14* (2013.01); *B65D 88/1675* (2013.01); *B65D 88/52* (2013.01)

(58) Field of Classification Search
CPC ..... A01F 25/14; A01F 12/60; B65D 88/1675; B65D 88/52; B65D 88/005; B65D 21/086
USPC ..................................................... 220/4.28, 8
See application file for complete search history.

(56) References Cited

U.S. PATENT DOCUMENTS

| | | | | |
|---|---|---|---|---|
| 4,978,021 A | * | 12/1990 | Mini | B65D 21/086 220/8 |
| 10,981,719 B2 | * | 4/2021 | Ford | B65D 88/26 |

FOREIGN PATENT DOCUMENTS

CA    3084147 A1    12/2020

* cited by examiner

*Primary Examiner* — Don M Anderson
*Assistant Examiner* — Elizabeth J Volz
(74) *Attorney, Agent, or Firm* — Bennett Jones LLP (57) ABSTRACT

An expandable and collapsible grain bin is provided, comprising: two telescoping cylindrical sections, an upper bin section and a lower bin section, the two telescoping cylindrical sections adapted to automatically interlock with one another when the grain bin is in an expanded position; a first lifting system for lifting the upper bin section until the upper bin section automatically interlocks with the lower bin section and lowering the upper bin section when collapsing the grain bin for storage or transport; and a bin cover attached at or near the top of the upper bin section for enclosing the grain bin.

13 Claims, 10 Drawing Sheets

LIFTING SYSTEMS FOR PORTABLE GRAIN BINS

FIELD OF THE INVENTION

The present invention relates generally to portable grain bins which are expandable to hold more grain and collapsible for easy transport. More particularly, the present invention relates to lifting systems for expanding and collapsing the portable grain bins.

BACKGROUND OF THE INVENTION

Historically, storage of grain by farmers occurred in large storage bins located on the farmers' properties. However, it has become increasingly more common for family grain farms to expand their operations by renting land for growing grain, which land may be a considerable distance from the base farm. Thus, during harvesting, which is an extremely time sensitive operation, it is impractical to truck the grain back to home base. In addition, because the land is rented, it is not practical to put expensive permanent grain bins on the land.

One option is to use grain bags, which are made of plastic, and which provide a low cost temporary storage of large volumes of grain. However, these plastic bags can only be used once and have become more unpopular due to environmental concerns. In addition, wildlife can poke holes into the grain bags during storage, causing grain to leak out and water to seep in. In addition, time and specialized equipment is needed to empty the grain bags and there is often more loss of grain when cleaning up the grain bags.

The present applicant has previously described a reusable grain bin that can be transported from field to field for reuse (see, for example, Canadian Patent Application 3,084,147). The portable grain bin is expandable to hold more grain and collapsible for easy transport; in particular, it comprises at least at least two telescoping cylindrical sections adapted to interlock with one another when the grain bin is in an expanded position. However, a standard bin crane or the like must be used to both expand and collapse the grain bin. Thus, there is a need in the industry for an expandable/collapsible grain bin having lifting system that allows the grain bin to expand and collapse without the need for a crane.

SUMMARY OF THE INVENTION

The present invention relates to a portable grain bin which is expandable to hold more grain and collapsible for easy transport. More particularly, lifting systems for expanding and collapsing the portable grain bins are provided herein to eliminate the need for lifting cranes of the prior art.

The present invention relates to an expandable and collapsible grain bin, comprising:
- two telescoping cylindrical sections, an upper bin section and a lower bin section, the two telescoping cylindrical sections adapted to automatically and reversibly interlock with one another when the grain bin is in an expanded position;
- a first lifting system for lifting the upper bin section until the upper bin section automatically interlocks with the lower bin section and for automatically unlocking and lowering the upper bin section when collapsing the grain bin for storage or transport; and
- a bin cover attached at or near the top of the upper bin section for enclosing the grain bin.

In one embodiment, the upper and lower bin sections interlock with one another by means of an automatic interlocking mechanism. In one embodiment, the upper bin section has an inner diameter that is larger than the outer diameter of the lower bin section. In another embodiment, the upper bin section has an outer diameter that is smaller than the inner diameter of the lower bin section.

In one embodiment, the bin cover of the expandable and collapsible grain bin is adapted to be in a raised position when the grain bin is in the expanded position and in a lowered position when the grain bin is in a collapsed position. In one embodiment, the expandable and collapsible grain bin further comprises a second lifting system for raising or lowering the bin cover.

BRIEF DESCRIPTION OF THE DRAWINGS

The invention will now be described by way of exemplary embodiments with reference to the accompanying simplified, diagrammatic, not-to-scale drawings.

DETAILED DESCRIPTION OF PREFERRED EMBODIMENTS

The detailed description set forth below in connection with the appended drawings is intended as a description of various embodiments of the present invention and is not intended to represent the only embodiments contemplated by the inventors. The detailed description includes specific details for the purpose of providing a comprehensive understanding of the present invention. However, it will be apparent to those skilled in the art that the present invention may be practised without these specific details.

Figure 1:
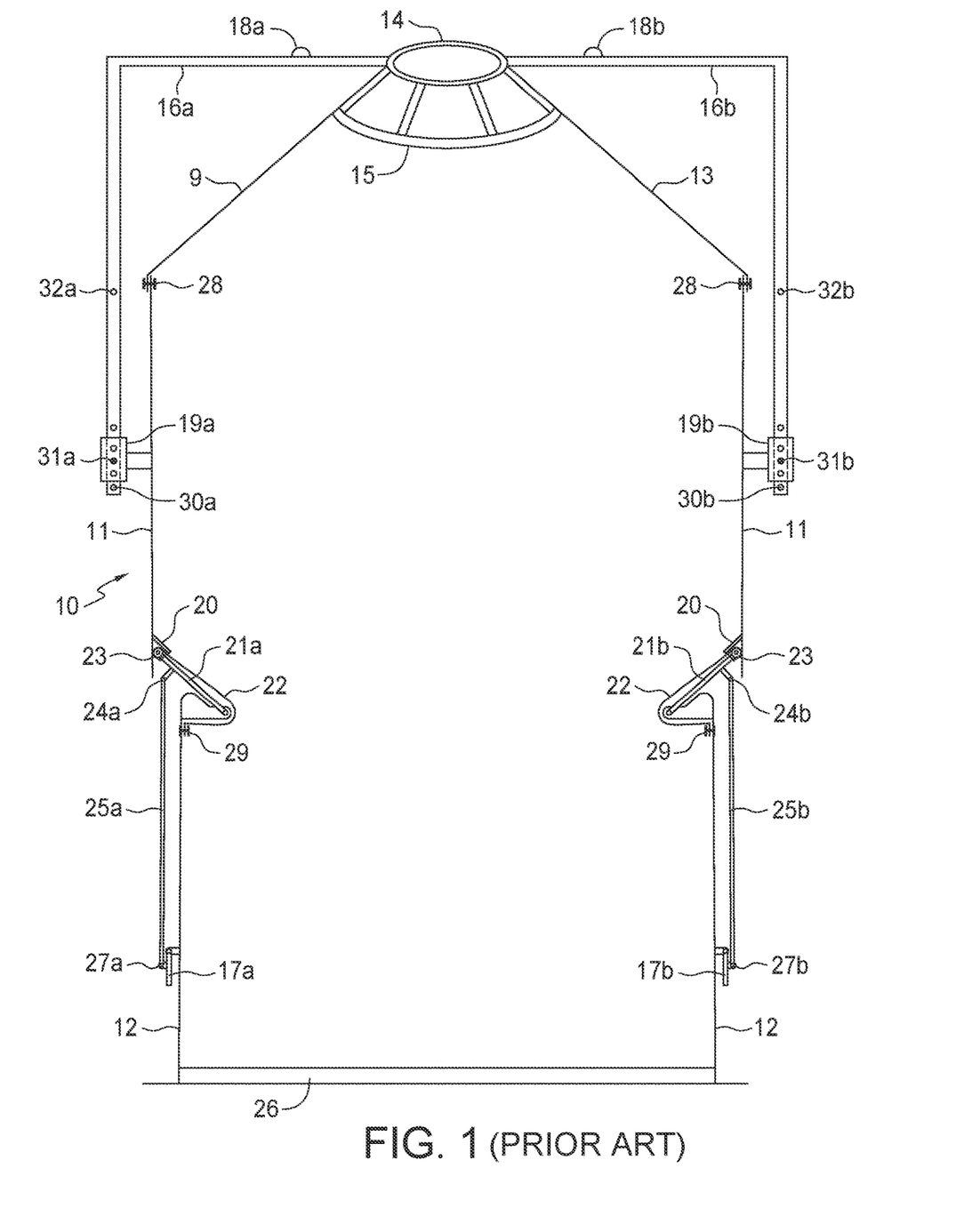
FIG. 1 (PRIOR ART) is a cross-sectional view of a prior art embodiment of an expandable and collapsible grain bin when in a fully expanded position ready to be filled with grain (working position), which bin can be modified using the present invention.

With reference first to FIG. 1 (PRIOR ART), FIG. 1 (PRIOR ART) is an illustration of an embodiment of the applicant's portable grain bin as described in Canadian Patent Application 3,084,147, incorporated herein by reference. Portable grain bin 10 comprises a lower bin section 12, the lower bin section 12 comprising an upper, substantially cylindrical vertical portion 14 and an angled hopper bottom cone 50. The lower bin section further comprises a plurality of support legs 51 (only two such support legs shown and labeled 51a, 51b) and a standard hopper bottom unload gate 52 for bin access. Portable grain bin 10 further comprises an upper bin section 11, which is substantially cylindrical and vertical. Upper bin section 11 has an inner diameter that is greater that the outer diameter of the vertical portion of lower bin section 12 such that when the bin is in the storage (also referred to as transport) position, the upper bin section can be lower to substantially cover the lower bin section and rest on steel base 26.

Portable grain bin 10 further comprises collapsible bin cover 9 comprising a tent-shaped tarp 13. It is understood that tarp 13 could also be domed-shaped. The wider, bottom of the tent-shaped tarp 13 is attached to the top outside edge of upper bin section 11 with fasteners 28 and the narrower, top of tarp 13 is attached to steel ring 14. A tarp support cage 15 is attached to steel ring 14 for supporting the upper portion of tarp 13. Bin cover 9 is shown in the expanded position in FIG. 1 (PRIOR ART) and is held in the expanded position by at least two support polls 16a and 16b, each attached to ring 14 at one end and to holders 19a and 19b, respectively, at the other end. Support polls 16a and 16b are pinned into holders 19a and 19b via pins 31a and 31b, respectively. In one embodiment, both support poles 16a, 16b and holders 19a, 19b have a plurality of holes 30a, 30b so that the height of tarp 13 can be adjusted according to a specific use and maintain tarp tension. Support polls 16a, 16b further comprise at least one crane hook receiver, 18a, 18b, respectively. Crane hooks (not shown) can hook into receivers 18a, 18b to lift and lower both the tarp 13 of collapsible bin cover 9 and upper bin section 11 with a standard bin crane or the like.

Upper bin section 11 is interlocked with lower bin section 12 via heavy steel ring 20 attached to the lower portion of bin section 11. Steel ring 20 is attached to the inner circumference of upper bin section 11 in such a way that it is at an inward downward angle for receiving a plurality of support members, which in this embodiment are support and sealing arms 21, positioned on the inner periphery of lower bin section 12. Only two such support and sealing arms, 21a and 21b, are shown in FIG. 1 (PRIOR ART) but it is understood that there can be more than two support and sealing arms. Each support and sealing arm 21 further comprises curved support pipe 23. Support and sealing arm 21 is covered with sealing tarp 22, which tarp 22 is held in place by snaps or rivets. Sealing tarp 22 is attached to the inner wall of upper bin section 12 with fasteners 29.

In this embodiment of portable grain 10, a bin crane is used to lift both the upper bin section 11 and tarp 13 of collapsible bin cover 9 so that each is in the fully expanded position as shown in FIG. 1 (PRIOR ART). The upper bin section can be lifted first by having support poles 16a and 16b first pinned down in pin holes 32a and 32b. In the alternative, tarp 13 can be first lifted which allows for easier access to the pin placement in pin holes 32a and 32b while the upper bin section 11 is in the lower position. In either case, the bin crane is attached to crane hook receivers 18a, 18b, and the upper bin section 11 is raised until the interlocking clicks into place. To lower upper bin section 11, the crane further lifts the upper bin section 11 to take pressure off the support and sealing arms 21. Once bin 10 is high enough that support and sealing arms 21 are clear of ring 20, the support and sealing arms 21 can be pushed into the retracted position via positioning rods 25 (two shown here as 25a and 25b) by moving leaver 17 (two shown here as 17a and 17b) into the upward position. Leaver 17 can again be held in position by a strap or the like (not shown). The bin crane can be lowered until upper bin section 11 rests on the steel base 26. The device could be stored in this position with the roof up or the roof down.

Figure 2:
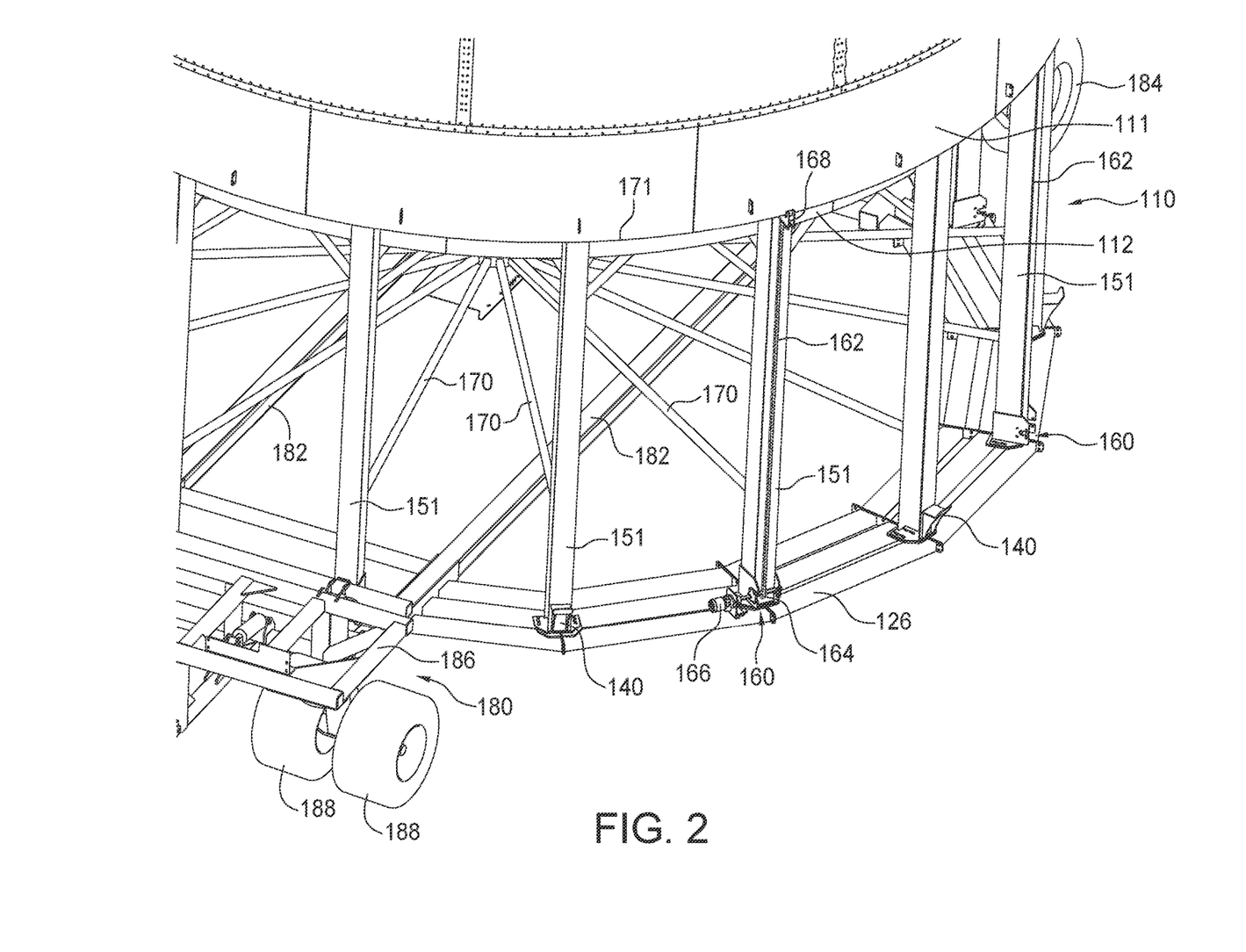
FIG. 2 is a perspective view of the bottom portion of the expandable and collapsible grain bin of FIG. 1 (PRIOR ART) which has been modified by an embodiment of the bin section lifting system of the present invention.

The present invention is directed to modifying a potable grain bin such as shown in FIG. 1 (PRIOR ART), for example, in order to eliminate the need of a crane to lift and lower both the upper bin section 11 and the tarp 13 of the collapsible bin cover 9 into the expanded position and the collapsed/storage/transport position. In particular, two lifting systems are described herein, one to raise the upper bin section until it locks into place in the expanded position and one to raise the collapsible bin cover (tarp). Turning first to the lifting system for lifting the upper bin section into the expanded and locked position, FIG. 2 shows one embodiment of a lifting system useful for lifting the upper bin section of a portable grain bin into a fully expanded position ready to receive grain and the like. This first lifting system will also be referred to herein as bin section lifting system. FIG. 2 shows the bottom portion of an expanded portable grain bin, i.e., where the upper bin section has been raised and locked into the expanded position.

With reference first to FIG. 2, portable grain bin 110 comprises two telescoping cylindrical sections, upper bin section 111 and lower bin section 112, which sections can be made of steel or galvanized steel. Affixed to the bottom of lower bin section 112 is an angled hopper bottom cone, which has been removed, i.e., is not shown in this figure, in order to better view the bin section lifting system 160 and the support structures for the hopper bottom. Upper bin section 111 has a larger inner diameter than the outer diameter of the lower bin section 112 so that when the grain bin is in the collapsed position, the upper bin section 111 can slide over lower bin section 112 when in the collapsed position. The portable grain bin 110 further comprises base 126; in this embodiment, base 126 comprises three side-by-side steel tubes, thereby forming a perimeter base. It is understood, however, that the base can also be a solid steel circle.

In this embodiment, the portable grain bin is supported by a plurality of support legs 151, which, in this embodiment, are sixteen vertical I-beams. The bottom of each support leg 151 is secured to base 126 and the top of each support leg is secured to the outside of the lower bin section 112 at or near its top. In this embodiment, there are sixteen such support legs 151. On the bottom of every other support leg 151 (i.e., on eight of the support legs) is secured a resting cradle 140, which cradle is designed to receive the bottom edge 171 of the upper bin section 111 when the grain bin is in the collapsed/storage/transport position. The resting cradles 140 ensure that the upper bin section 111 does not jostle or move during transport. Further, the resting cradles 140 ensure that the upper bin section 111 does not crush or damage the motors (which motors are described below) of the lifting system 160. Each support leg adjacent to the eight support legs having resting cradles is equipped with a bin section lifting system 160 of the present invention. The main features of the bin section lifting system 160 are a continuous loop lifting chain 162, an upper and lower sprocket around which the lifting chain 162 is wrapped (only lower sprocket 164 at the lower end of lifting chain 162 is shown in FIG. 2), a reversible hydraulic or electric motor 166, and lifting hook 168, upon which the lower edge of the upper bin section 111 rests until the automatic interlocking system engages. The bin section lifting system 160 will be described in more detail below, with reference to FIGS. 3 and 4.

FIG. 2 further shows a plurality of radial hopper bottom support bars 170 for supporting the angled hopper bottom cone of lower bin section 112, which, as previously mentioned, hopper bottom has been removed in FIG. 2 so that the features at the bottom of the portable grain bin can be seen more clearly. In this embodiment, portable grain bin 110 is also equipped with a built-in transport assembly 180. In particular, transport assembly 180 comprises two transverse steel bars 182 that are secured at each of their ends to base 126. At one end of transverse steel bars 182 is a rear dolly 184 comprising at least two wheels (only one of said 184 is shown in FIG. 2). At the other end of transverse steel bars 182 is a detachable front dolly 186 having a plurality of wheels 188 (only two wheels 188 shown in FIG. 2) and a hitch (not shown) for attaching to a tractor and the like to move the portable grain bin from place to place.

Figure 3:
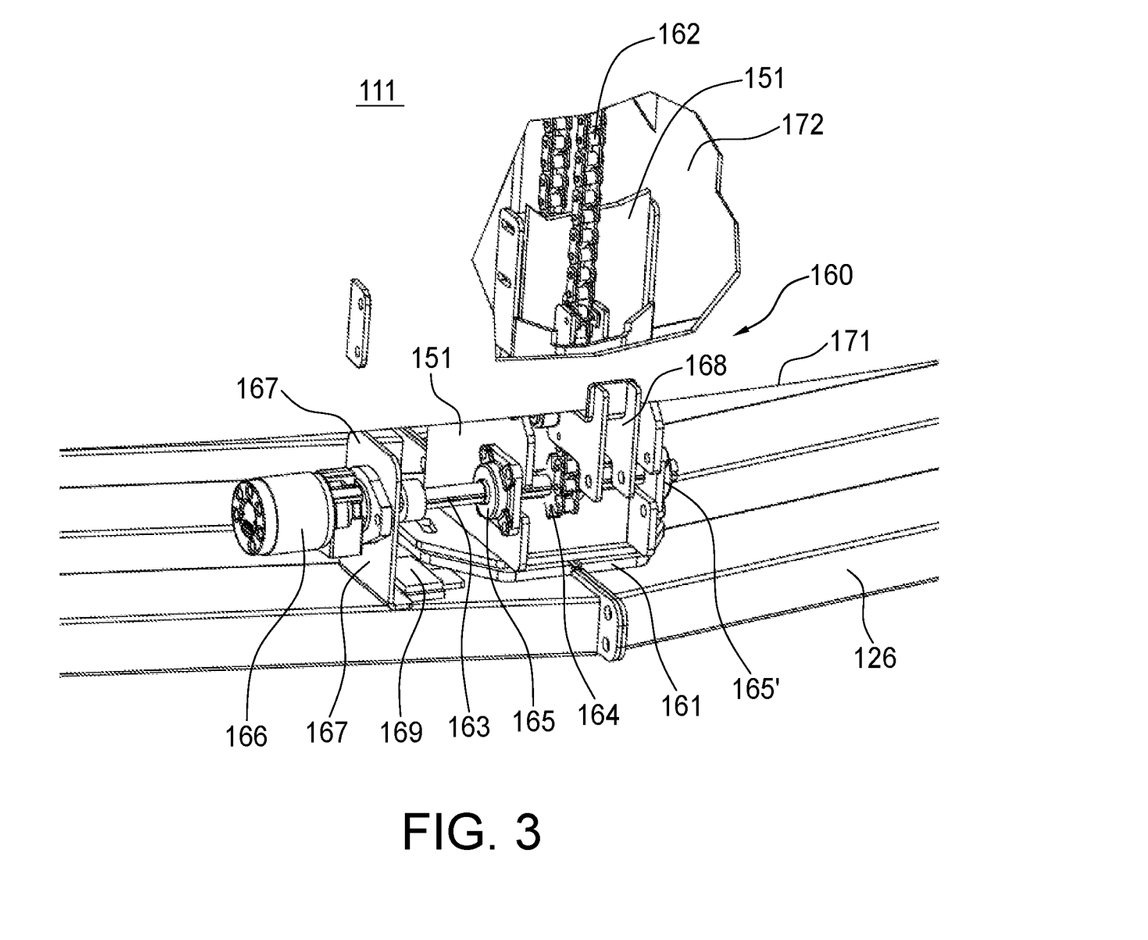
FIG. 3 is an enlarged perspective view of the bin section lifting system as shown in FIG. 2.

With reference now to FIG. 3, bin section lifting system 160 will be described in more detail. In FIG. 3, the portable grain bin is in the collapsed (also referred to as the storage or transport position), in that upper bin section 111 is in the lowered position, thereby covering lower bin section, and the lower edge 171 of the upper bin section 111 is resting on lifting hook 168. As can be seen in FIG. 3, the lower end of bin section lifting system 160 is secured to base 126 via support plate 161 and upon which support leg 151, which in this embodiment is an I-beam, is supported. As can be seen in FIG. 3, in particular, in the cut-out section 172 of upper bin section 111, lifting chain 162 is a continuous loop that wraps around both the front face and the back face of the flat portion of support leg (I-beam) 151 (I-beam has been cut away but it is understood that the I-beam extends up to or near the top of the lower bin section). Lifting chain also wraps around lower sprocket 164 and upper sprocket (not shown in FIG. 3), thereby giving the chain a continuous loop motion.

As shown in FIG. 3, lifting hook 168 is secured to the front part of continuous loop lifting chain 162 such that when lifting chain is being moved in the forwardly direction, it will lift lifting hook 168. Since the lower part of the upper bin section 111 is engaged with the lifting hook 168, the upper bin section 111 will also be lifted (or raised) by lifting hook 168. In one embodiment, the lower part of the upper bin section 111 can be attached to the lifting hook 168 by means of a mechanical fastening device such as bolts, screws, nuts, pins, washers, anchors, rivets, etc. or welded together. Lower sprocket 164 is operated by drive shaft 163 which drive shaft 163 is secured by means of two opposing bearings, 165 and 165'. Attached at one end of drive shaft 163 is a reversible hydraulic motor 166. It is understood, however, that the motor could also be a reversible electric motor. Thus, when the hydraulic motor 166 operates in the forward direction, the lifting chain 162 will lift lifting hook 168 and, hence, upper bin 111 until an automatic interlocking device (for example, such as described in FIG. 1 (PRIOR ART) is engaged, thereby automatically interlocking the upper bin section 111 with the lower bin section 112. Once the upper and lower bin sections are locked together, lifting hook 168 no longer bears the weight of the upper bin section 111. Hydraulic motor 166 further comprises a motor mounting plate 167, which is attached to motor mount holder 169.

Figure 4:
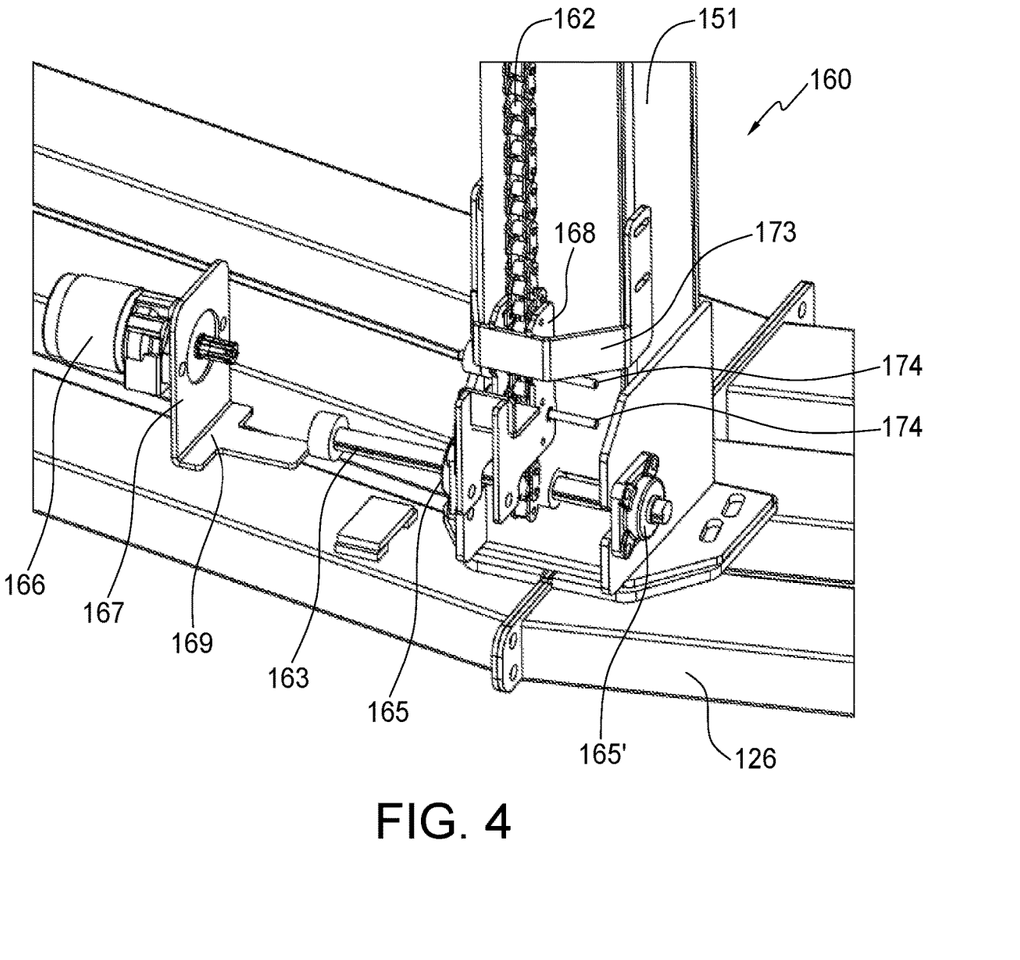
FIG. 4 is an enlarged perspective view of the bin section lifting system as shown in FIG. 3 where the upper bin section has been removed for better viewing of the bin section lifting system.

As shown in FIG. 4, hydraulic motor 166 is designed such that it is removable, i.e., can be disconnected, once the portable grain bin is in the expanded position and therefore can be used with another portable grain bin. Ultimately, this will be a cost saving for those operators who have a plurality of portable grain bins. FIG. 4 also shows how lifting hook 168 is attached to the front portion of continuous loop lifting chain 162. In particular, two pins 174 are used to thread through lifting chain 168 to secure the lifting hook 168 to lifting chain 162. In one embodiment, bin section lifting system 160 further comprises a lifting hook stabilizer 173 to keep the lifting hook 168 in the vertical position, which is especially important during lifting. The stabilizer 173 slides up and down the I-beam along with the lifting hook 168 and holds the lifting hook 168 in position at all times.

Figure 5A:
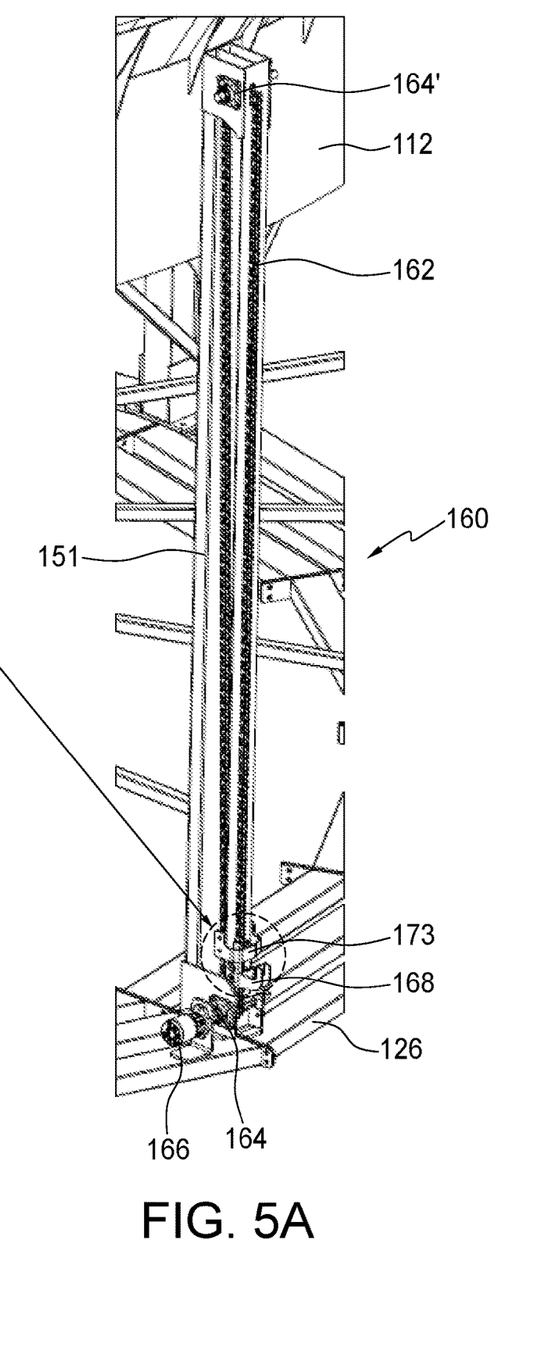
FIG. 5A is a perspective view of the bin section lifting system of FIGS. 2, 3 and 4 showing how the upper end of the bin lifting system is attached to the outside of the upper portion of the lower bin section and the lower portion is attached to the base of the portable grain bin.
Figure 5B:
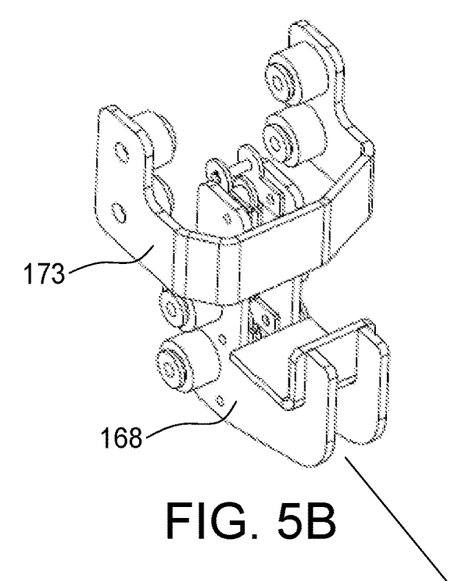
FIG. 5B is an enlarged perspective view of the lifting hook and the stabilizer shown in FIG. 5A.

FIG. 5A is a perspective view of the entirety of bin section lifting system 160 and shows that the top of support leg 151, which supports bin section lifting system 160, is attached to the upper portion of lower bin section 112 and that the bottom of support leg 151 is attached to base 126. FIG. 5A also shows continuous loop lifting chain 162 and how the lifting chain 162 wraps around upper sprocket 164' and lower sprocket 164. FIG. 5B is a call out from FIG. 5B, which shows an enlarged perspective view of lifting hook 168 and stabilizer 173, which are both adapted to move up and down with lifting chain 162.

Figure 6:
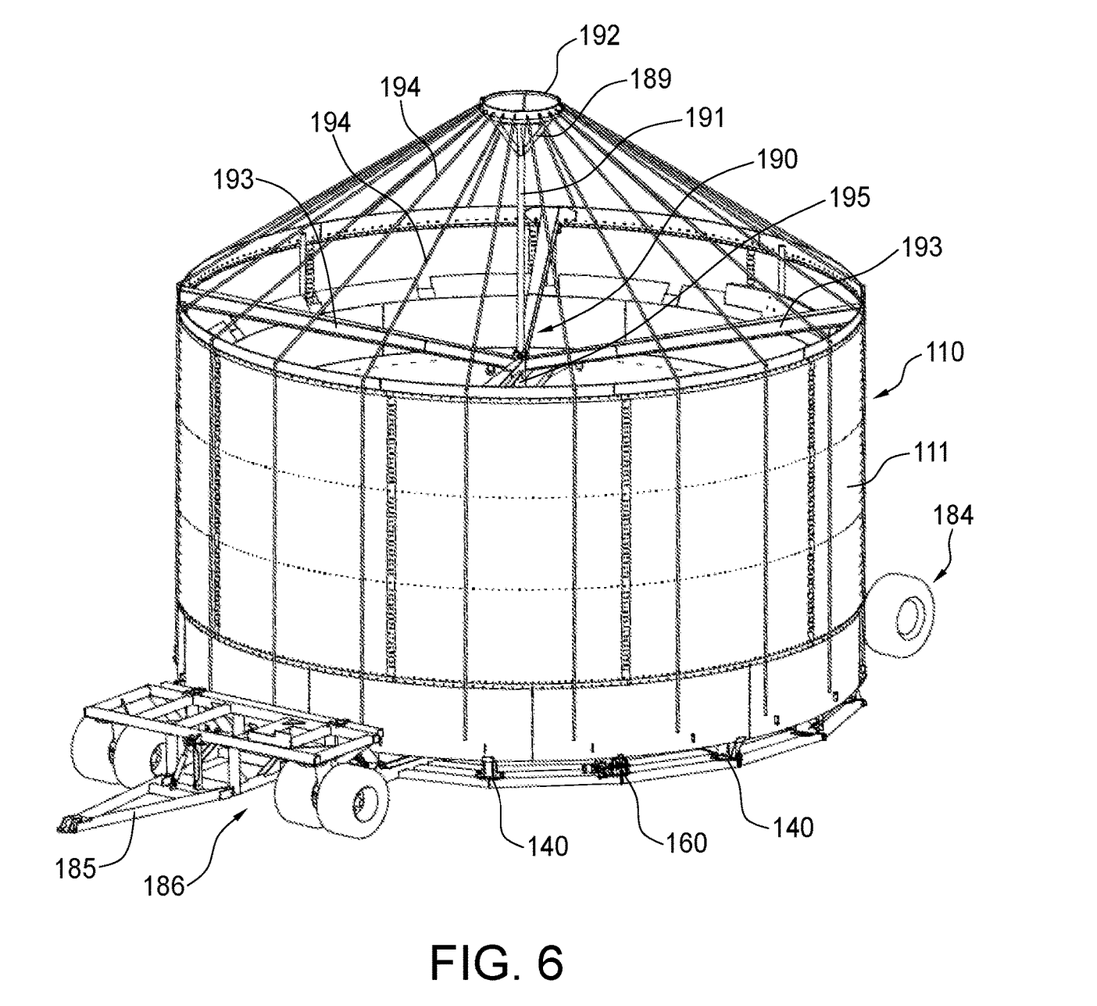
FIG. 6 is perspective views of a portable grain bin of the present invention which shows a second lifting system, referred to herein as roof lifting system, for lifting and lowering a collapsible bin cover.
Figure 7:
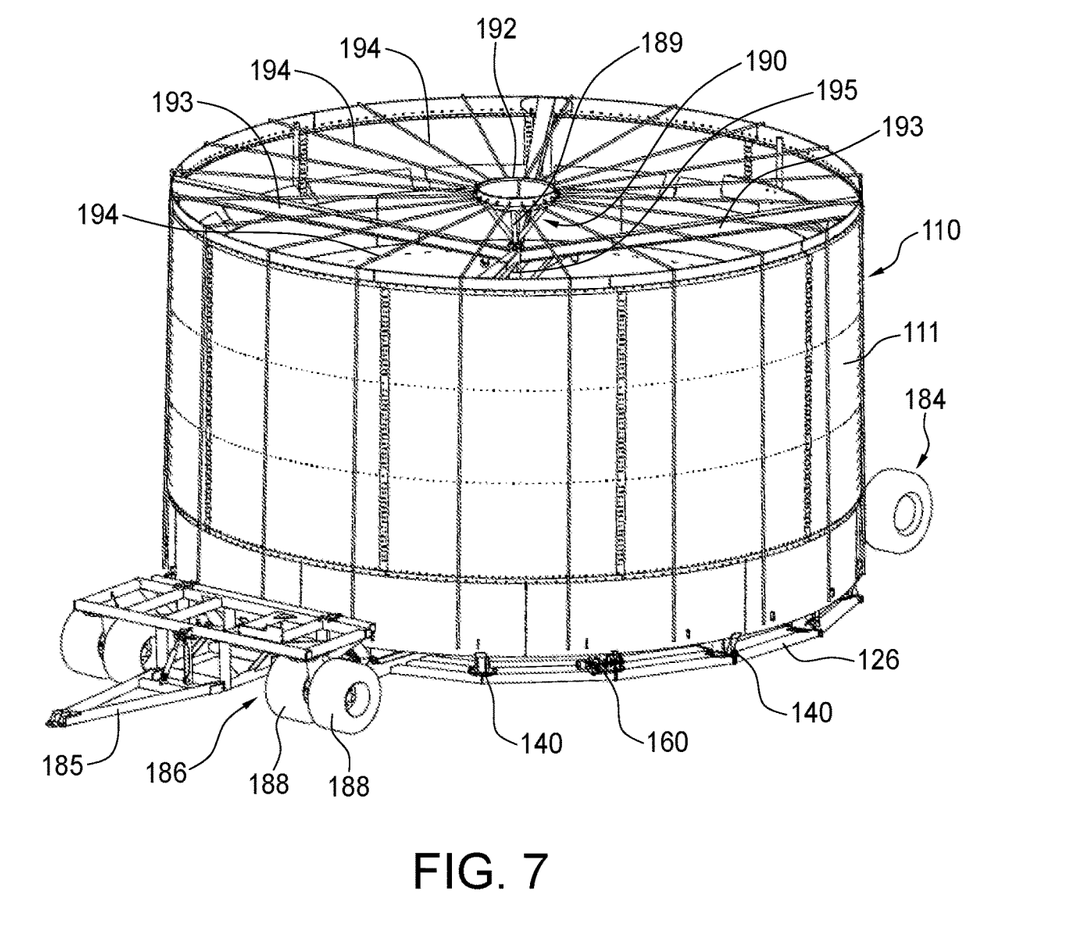
FIG. 7 is a perspective view of the portable grain bin of FIG. 6 in its fully collapsed transport position.

FIG. 6 is perspective views of a portable grain bin 110 of the present invention, where the upper bin section 111 is in the lower or collapsed position. In this figure, detachable trolley 186 having a plurality of wheels 188 can be seen in more detail. In particular, hitch 185 is now visible for attaching to a tractor and the like to move the portable grain bin 110 from place to place. As previously mentioned, portable grain bin 110 further comprises a collapsible bin cover, which is generally comprised of a tent-shaped tarp. It is understood that tarp could also be domed-shaped. With further reference to FIG. 6, a second lifting system, referred to herein as roof lifting system 190, is illustrated. As can be seen in FIG. 6, the tarp has been removed to provide a clearer view of tarp lifting system 190. Roof lifting system 190 comprises a roof lifting pole 191, which is attached at its top end to bin cover fill port 192 by means of fill port support arms 189. Roof lifting pole 191 is capable of being lifted and lowered, as will be described in more detail below, by sliding up and down through lift pole support guide 195. Support guide 195 is secured to the grain bin by means of a plurality of support beams 193, which are shown here as four I-beams. Each support beam 193 is secured to the inside of upper bin section 111 at or near its top and therefore provide support for roof lifting pole 191. FIG. 6 also shows a plurality of tarp support cables 194 which support the tarp (not shown) and may be inserted in the tarp. The tarp support cables 194 may be tightened at their ends to ensure that the tarp remains taut. FIG. 7 is a perspective view of the portable grain bin 110 as shown in FIG. 6, in its fully collapsed transport position, where both the upper bin section 111 and the collapsible bin cover are in the lower or collapsed position.

Figure 8:
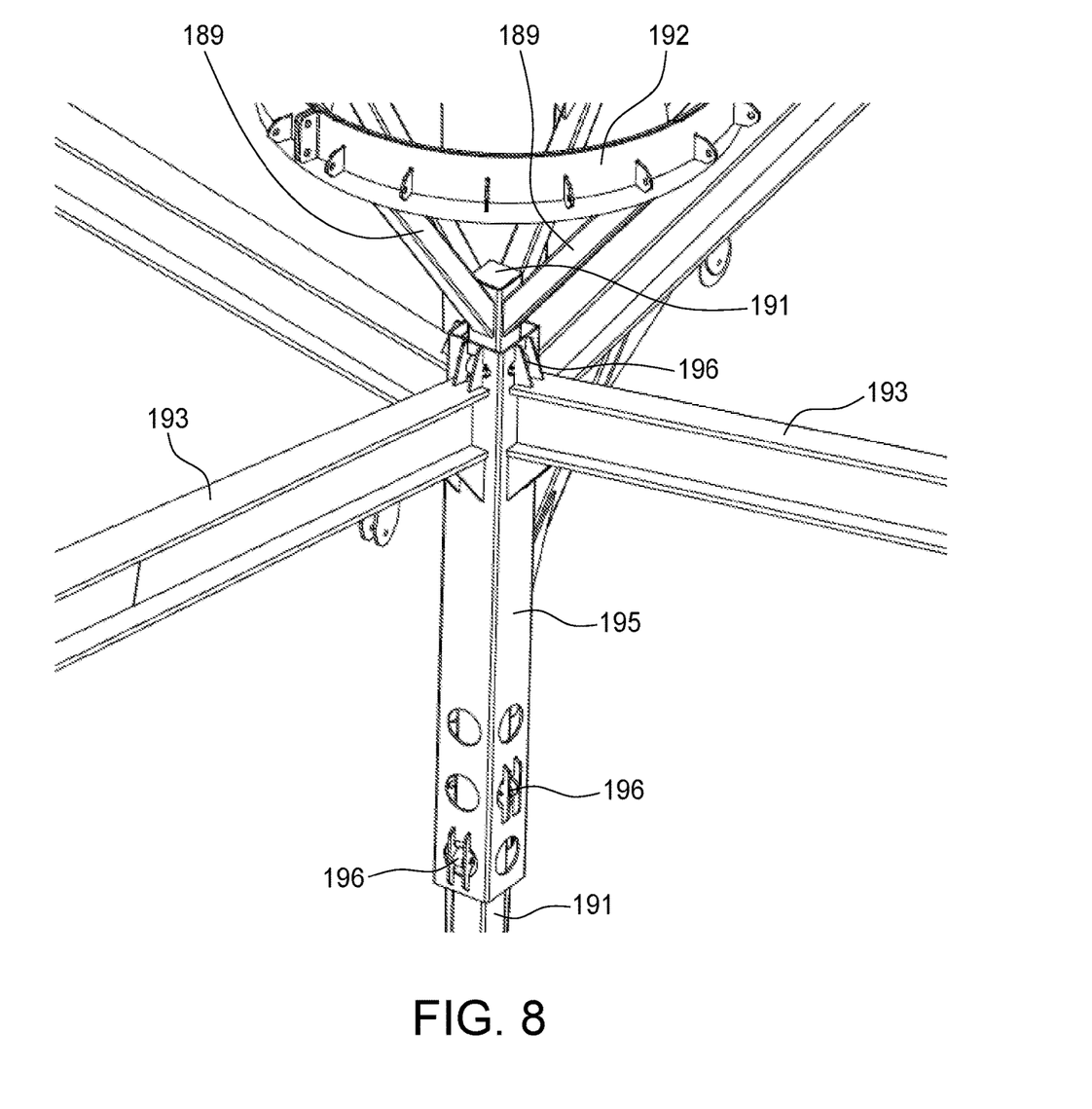
FIG. 8 is a close up of a portion of the roof lifting system when the portable grain bin is in the fully collapsed position, as shown in FIG. 7.

FIG. 8 is a close up of a portion of roof lifting system 190 when the portable grain bin is in the fully collapsed position as shown in FIG. 7. In particular, FIG. 8 shows how roof lifting pole 191, which is attached at its top end to bin cover fill port 192 by means of fill port support arms 189, is inserted into lift pole support guide 195, which allows it to freely slide up and down through lift pole support guide or sleeve 195. To ensure that such free up and down mobility is maintained, lift pole support guide may have a plurality of rollers 196 fastened thereto so that the rollers are inside support guide 195 to provide free movement of roof lift pole 191. FIG. 8 further shows how support beams 193, which are shown here as four I-beams, are secured to lift pole support guide 195 to secure it in place. Thus, roof lift pole 191 can freely move up and down through support guide 195 to lift or lower the collapsible bin cover.

Figure 9:
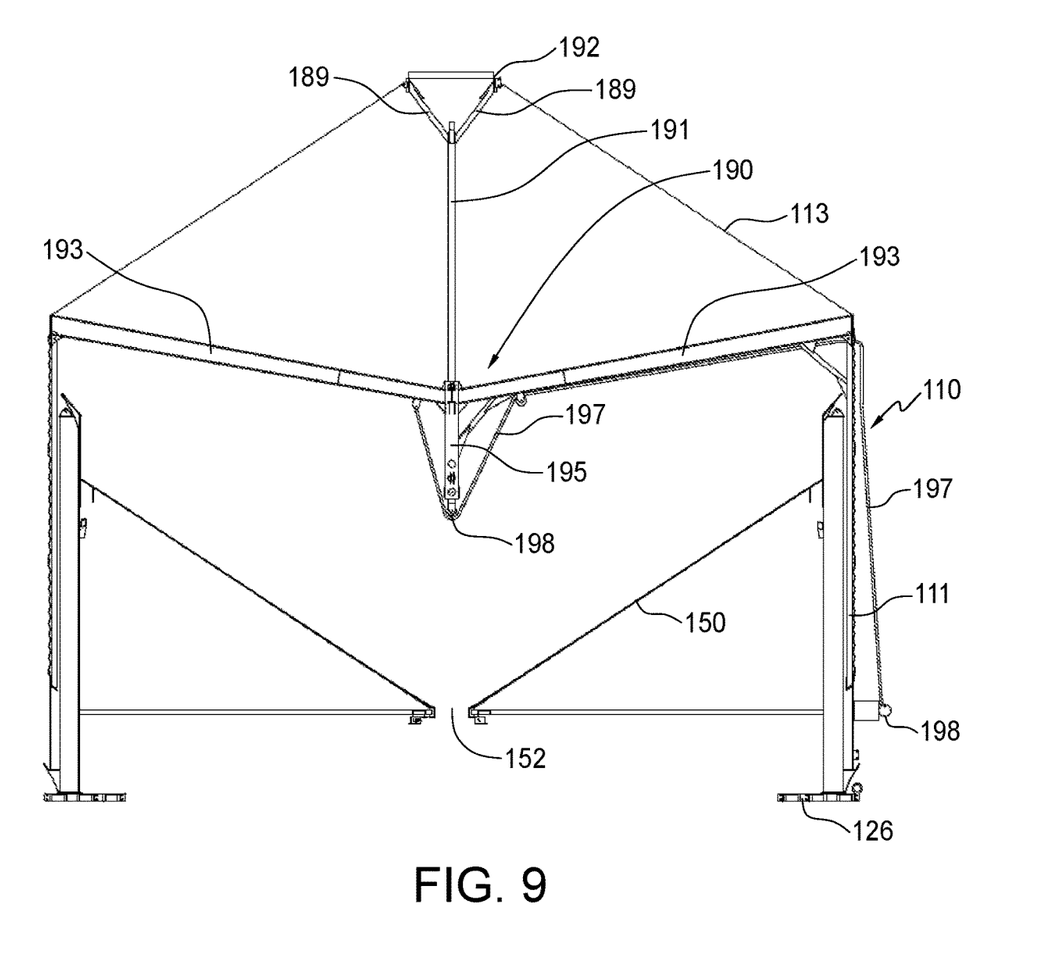
FIG. 9 is a cross-section of a portable grain bin of the present invention having an angled hopper bottom cone and a collapsible bin cover illustrating the roof lifting system of the present invention where the collapsible bin cover is in the raised position.

FIG. 9 is a cross-section of a portable grain bin 110 of the present invention having an angled hopper bottom cone 150 and a collapsible bin cover 113 comprising a tarp. In FIG. 9, the upper bin section 111 is in its lowered or collapsed position but the collapsible bin cover 113 is in the raised or expanded position (as also shown in FIG. 7) and it illustrates a cable system which is incorporated into roof lifting system 190. In particular, it can be seen that roof lift pole 191 further comprises a pulley 198 at its bottom end and has roof lift cable 197 wrapped thereon, which roof lift cable 197 is attached at one end to roof lift winch 198. Roof lift winch 198 is secured to the outer surface of upper bin section 111. Thus, roof lift cable 197 can be pulled either upwardly to raise collapsible bin cover 113 by raising roof lift pole 191 or downwardly to lower collapsible bin cover 113. This can be done either manually, using a crank or the like, or can be operated by a hydraulic or electric motor. It can be seen in FIG. 9 that roof lift cable 197 can be secured to the bottom of at least two of support beams 193 and additional pulleys can be used to guide the roof lift cable 197.

Figure 10:
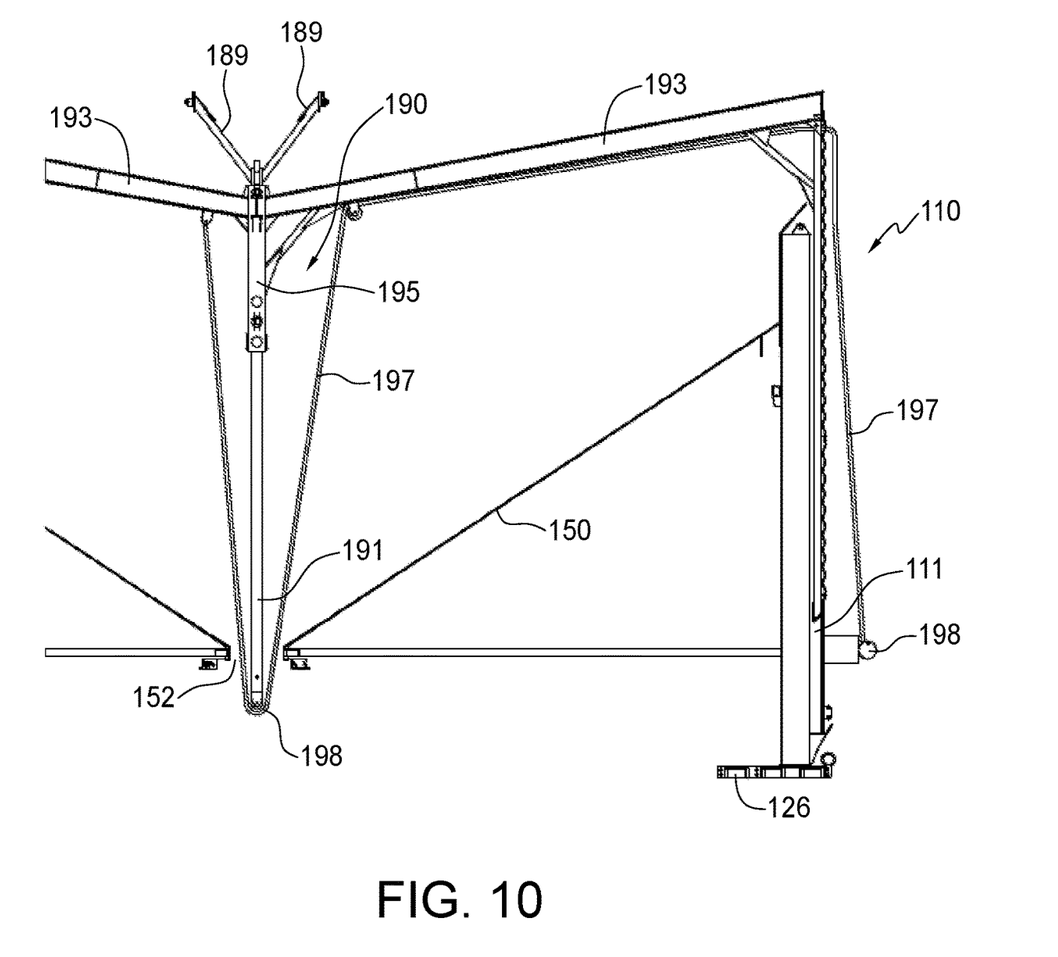
FIG. 10 is a cross-section of the portable grain bin of FIG. 9 where the collapsible bin cover is in the lowered or collapsed position.

FIG. 10 is a cut-away cross-section of the portable grain bin of FIG. 9 where the collapsible bin cover 113 (not shown) is in the lowed or collapsed position. As can be seen in FIG. 10, when the roof lift pole 191 is in the lowest position (i.e., when the collapsible bin cover 113 is in its collapsed position), it can fit through hopper opening 152, which generally is equipped with a standard hopper bottom unload gate (not shown).

Interpretation

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, 10%, 20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

What is claimed is:

1. An expandable and collapsible grain bin, comprising:
   two telescoping cylindrical sections, an upper bin section and a lower bin section, the two telescoping cylindrical sections adapted to automatically and reversibly interlock with one another when the grain bin is in an expanded position;
   a first lifting system for lifting the upper bin section until the upper bin section automatically interlocks with the lower bin section and for automatically unlocking and lowering the upper bin section when collapsing the grain bin for storage or transport;
   a plurality of support legs secured to the lower bin section for securing the grain bin to a base, wherein the first lifting system is attached to at least one of the plurality of support legs; and
   a bin cover attached at or near the top of the upper bin section for enclosing the grain bin.

2. The expandable and collapsible grain bin as claimed in claim 1, wherein the upper and lower bin sections automatically interlock with one another by means of an interlocking mechanism.

3. The expandable and collapsible grain bin as claimed in claim 1, wherein the upper bin section has an inner diameter that is larger than the outer diameter of the lower bin section.

4. The expandable and collapsible grain bin as claimed in claim 1, wherein the upper bin section has an outer diameter that is smaller than the inner diameter of the lower bin section.

5. The expandable and collapsible grain bin as claimed in claim 1, wherein the first lifting system comprises a continuous loop lifting chain wrapped around an upper and lower sprocket, a lifting hook secured near the bottom of the lifting chain such that a lower edge of the upper bin section engages with the lifting hook, and a reversible hydraulic or electric motor to rotate the lifting chain to raise and lower the upper bin section.

6. The expandable and collapsible grain bin as claimed in claim 5, wherein the lower part of the upper bin section is attached to the lifting hook by means of a mechanical fastening device or welded together.

7. The expandable and collapsible grain bin as claimed in claim 1, wherein there are at least two first lifting systems attached to at least two support legs.

8. The expandable and collapsible grain bin as claimed in claim 1, wherein the bin cover is adapted to be in a raised position when the grain bin is in the expanded position and in a lowered position when the grain bin is in a collapsed position.

9. The expandable and collapsible grain bin as claimed in claim 8, further comprising a second lifting system for raising or lowering the bin cover.

10. The expandable and collapsible grain bin as claimed in claim 9, wherein the second lifting system comprises a lift pole support sleeve located in the interior of the grain bin for slideably receiving a lift pole, the lift pole being attached at one end to the top of the bin cover and at the opposite end to a pulley having a cable wrapped there around, and a winch attached to the cable for raising and lowering the cable to lift and lower the lift pole to raise and lower the bin cover.

11. The expandable and collapsible grain bin as claimed in claim 9, wherein the winch is operated by means of a crank, a hydraulic motor or an electric motor.

12. An expandable and collapsible grain bin, comprising:
two telescoping cylindrical sections, an upper bin section and a lower bin section, the two telescoping cylindrical sections adapted to automatically and reversibly interlock with one another when the grain bin is in an expanded position;
a first lifting system for lifting the upper bin section until the upper bin section automatically interlocks with the lower bin section and for automatically unlocking and lowering the upper bin section when collapsing the grain bin for storage or transport, wherein the first lifting system comprises a continuous loop lifting chain vertically extending and coupled adjacent an outer surface of the lower bin section, the continuous loop lifting chain wrapped around an upper sprocket and a lower sprocket, a lifting hook secured to move with the lifting chain and positioned near the bottom of the continuous loop lifting chain, when the grain bin is in a collapsed position, such that a lower edge of the upper bin section engages with the lifting hook, and a reversible hydraulic or electric motor to rotate the continuous loop lifting chain to raise and lower the upper bin section; and
a bin cover attached at or near the top of the upper bin section for enclosing the grain bin.

13. The expandable and collapsible grain bin as claimed in claim 12, wherein there are at least two continuous loop lifting chains.

\* \* \* \* \*